(12) United States Patent
Bomleny et al.

(10) Patent No.: US 7,430,846 B2
(45) Date of Patent: Oct. 7, 2008

(54) FLOATING HEADER WITH INTEGRATED FLOAT SYSTEM FOR USE WITH AN AGRICULTURAL WINDROWER OR COMBINE

(75) Inventors: Duane M. Bomleny, Geneseo, IL (US); Jay T. Hulscher, Waseca, MN (US); Travis L. Bunde, Shakopee, MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/684,947

(22) Filed: Mar. 12, 2007

(65) Prior Publication Data

US 2007/0214760 A1    Sep. 20, 2007

Related U.S. Application Data

(63) Continuation-in-part of application No. 11/125,419, filed on May 10, 2005, now Pat. No. 7,222,475, and a continuation-in-part of application No. 11/125,420, filed on May 10, 2005, now Pat. No. 7,207,164, and a continuation-in-part of application No. 11/125,421, filed on May 10, 2005, now Pat. No. 7,191,582.

(51) Int. Cl.
*A01D 41/14* (2006.01)
*A01D 46/08* (2006.01)
*A01D 75/28* (2006.01)

(52) U.S. Cl. .................................. 56/10.2 E

(58) Field of Classification Search ............... 56/208, 56/15.8, 15.6, 14.9, 10.2 E
See application file for complete search history.

(56) References Cited

U.S. PATENT DOCUMENTS

| | | | |
|---|---|---|---|
| 3,574,990 A * | 4/1971 | Calder | 56/208 |
| 3,597,907 A | 8/1971 | Neal et al. | 56/208 |
| 3,623,304 A | 11/1971 | Molzahn | 56/208 |
| 3,686,838 A | 8/1972 | Comeau et al. | 56/10.2 |
| 3,717,995 A | 2/1973 | Case | 60/470 |
| 3,959,957 A | 6/1976 | Halls | 56/208 |
| 4,193,250 A | 3/1980 | Kessens et al. | 56/208 |
| 4,307,559 A | 12/1981 | Jupp et al. | 56/11.9 |
| 4,409,778 A | 10/1983 | McNaught | 56/10.2 |
| 4,437,295 A | 3/1984 | Rock | 56/10.2 |
| 4,612,757 A | 9/1986 | Halls et al. | 56/10.2 |
| 4,622,803 A | 11/1986 | Lech | 56/10.2 |
| 4,641,490 A | 2/1987 | Wynn et al. | 56/10.2 |
| 4,724,661 A * | 2/1988 | Blakeslee et al. | 56/208 |
| 4,733,523 A | 3/1988 | Dedeyne et al. | 56/209 |

(Continued)

FOREIGN PATENT DOCUMENTS

EP           0 208 794        11/1985

(Continued)

*Primary Examiner*—Árpád Fábián-Kovács
(74) *Attorney, Agent, or Firm*—Taylor & Aust, P.C.

(57) ABSTRACT

An agricultural windrower includes a vehicle chassis, a lift frame movably mounted to the vehicle chassis, and a crop harvesting header coupled with the lift frame. The header includes a main frame and an integrated header float system. The header float system has at least one float cylinder coupled with the main frame. The header also includes a suspension which may be selectively mounted to one of a plurality of differently configured types of agricultural harvesters, such as a combine or windrower.

17 Claims, 13 Drawing Sheets

U.S. PATENT DOCUMENTS

| | | | |
|---|---|---|---|
| 4,776,153 A | 10/1988 | DePauw et al. | 56/10.2 |
| 4,845,931 A | 7/1989 | Brunér et al. | 56/208 |
| 4,956,966 A * | 9/1990 | Patterson | 56/181 |
| 4,961,303 A * | 10/1990 | McCarty et al. | 56/14.1 |
| 5,005,343 A | 4/1991 | Patterson | 56/14.4 |
| 5,157,905 A * | 10/1992 | Talbot et al. | 56/15.9 |
| 5,327,709 A | 7/1994 | Webb | 56/15.8 |
| 5,337,544 A * | 8/1994 | Lauritsen | 56/15.7 |
| 5,463,854 A | 11/1995 | Chmielewski, Jr. et al. | 56/10.2 E |
| 5,464,371 A | 11/1995 | Honey | 460/20 |
| 5,471,523 A | 11/1995 | Smith et al. | 379/165 |
| 5,471,823 A | 12/1995 | Panoushek et al. | 56/10.2 |
| 5,473,870 A | 12/1995 | Panoushek et al. | 56/10.2 E |
| 5,535,577 A | 7/1996 | Chmielewski et al. | 56/10.2 E |
| 5,535,578 A | 7/1996 | Honey | 56/14.9 |
| 5,577,373 A | 11/1996 | Panoushek et al. | 56/10.2 |
| 5,633,452 A | 5/1997 | Bebernes | 73/37 |
| RE35,543 E | 7/1997 | Patterson | 56/14.4 |
| 5,661,964 A | 9/1997 | Paulson et al. | 56/64 |
| 5,713,190 A | 2/1998 | Vermeulen et al. | 56/10.2 E |
| 5,778,644 A | 7/1998 | Keller et al. | 56/11.2 |
| 5,799,483 A | 9/1998 | Voss et al. | 56/14.9 |
| 5,906,089 A | 5/1999 | Guinn et al. | 56/10.2 E |
| 5,964,077 A | 10/1999 | Guinn | 56/10.2 E |
| 5,983,615 A | 11/1999 | Schmid et al. | 56/208 |
| 6,041,583 A | 3/2000 | Goering et al. | 56/10.2 |
| 6,076,342 A * | 6/2000 | Loehr | 56/208 |
| 6,151,874 A | 11/2000 | Eis | 56/10.2 E |
| 6,202,395 B1 | 3/2001 | Gramm | 56/10.2 E |
| 6,530,197 B1 * | 3/2003 | Christensen et al. | 56/10.2 E |
| 6,588,187 B2 * | 7/2003 | Engelstad et al. | 56/10.2 E |
| 6,675,568 B2 | 1/2004 | Patterson et al. | 56/208 |
| 6,758,029 B2 | 7/2004 | Beaujot | 56/10.2 E |
| 7,104,181 B2 | 9/2006 | Bitter et al. | 91/437 |
| 7,168,226 B2 | 1/2007 | McLean et al. | 56/10.2 E |
| 2003/0019196 A1* | 1/2003 | Coers et al. | 56/10.2 G |

FOREIGN PATENT DOCUMENTS

| | | |
|---|---|---|
| WO | WO87/00393 | 7/1985 |

* cited by examiner

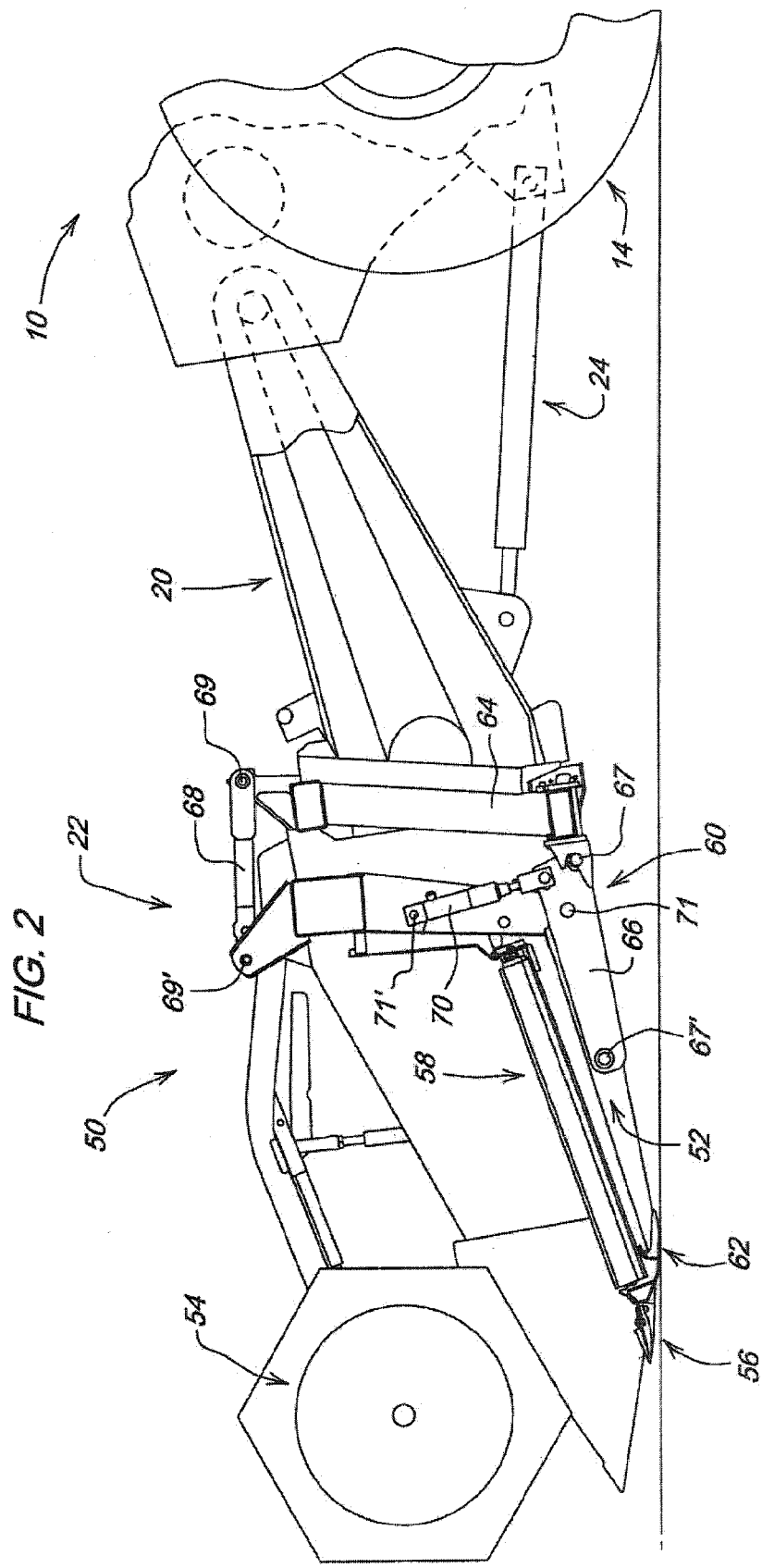

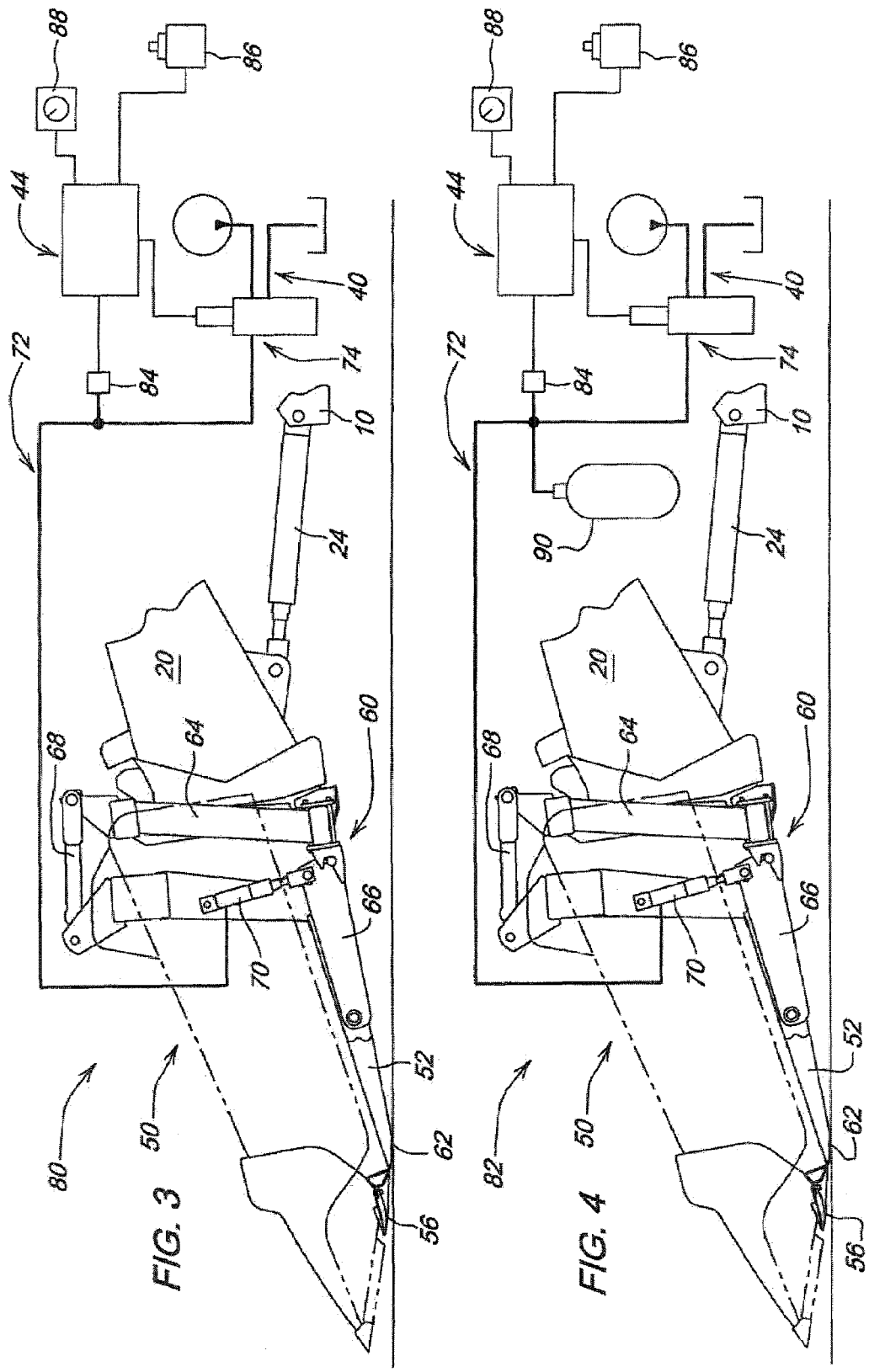

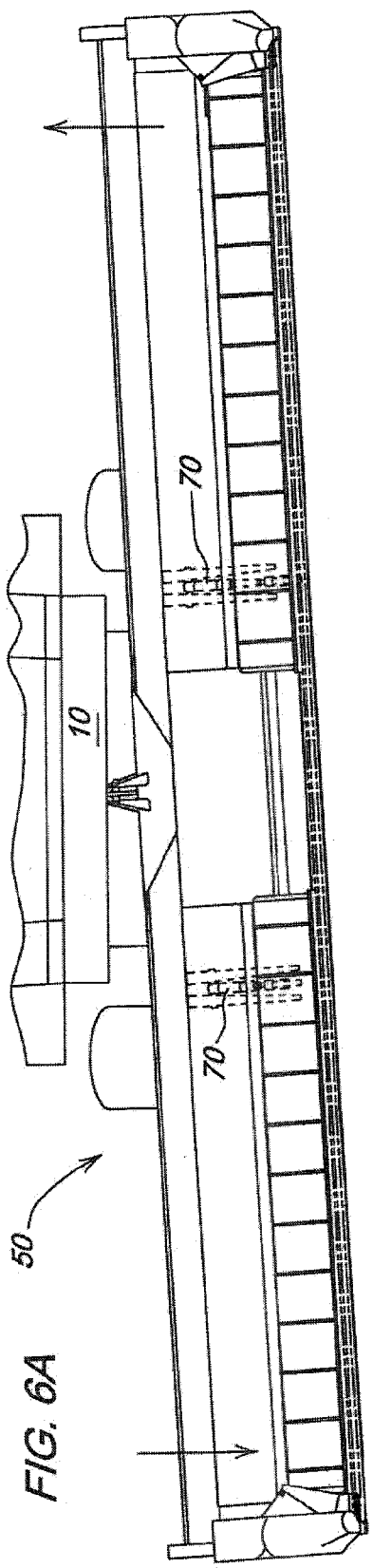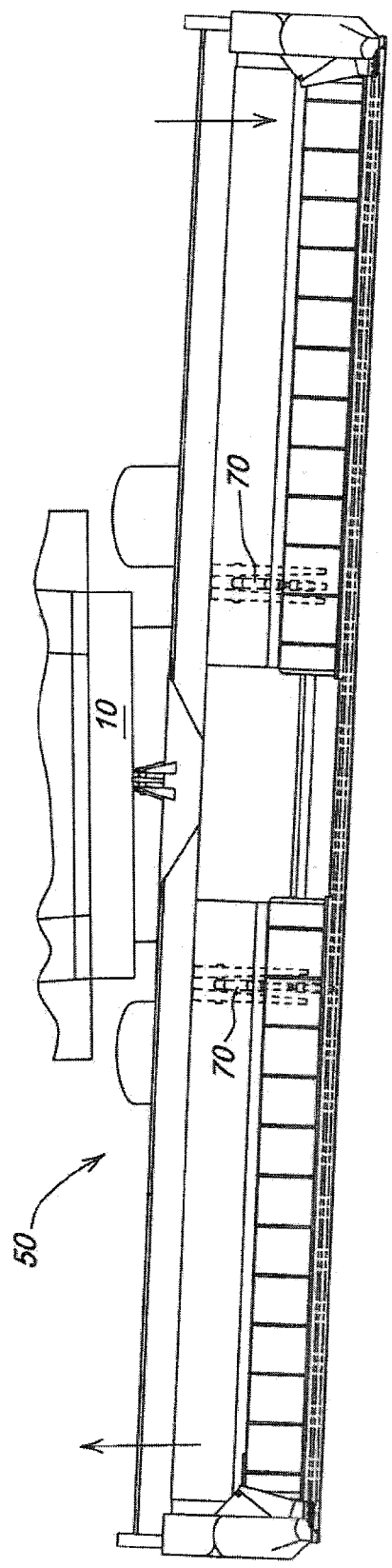

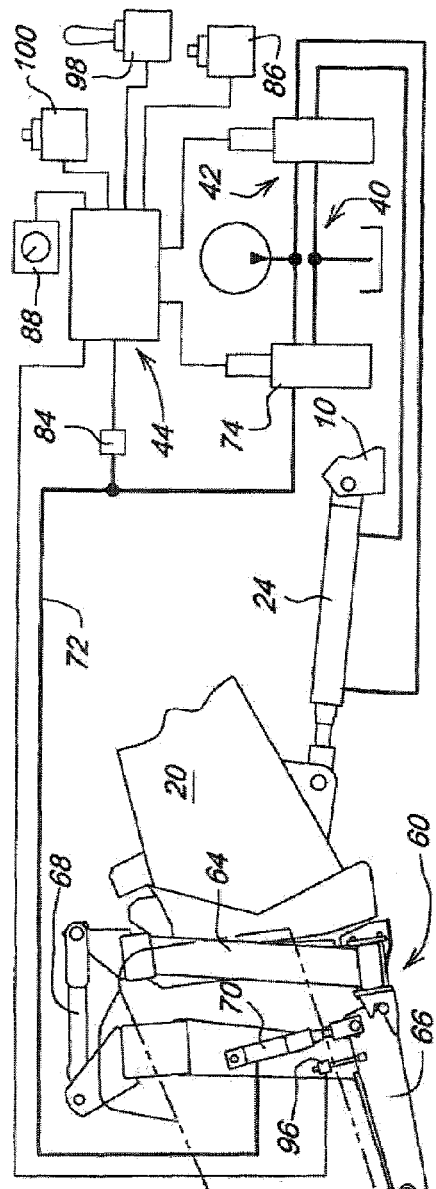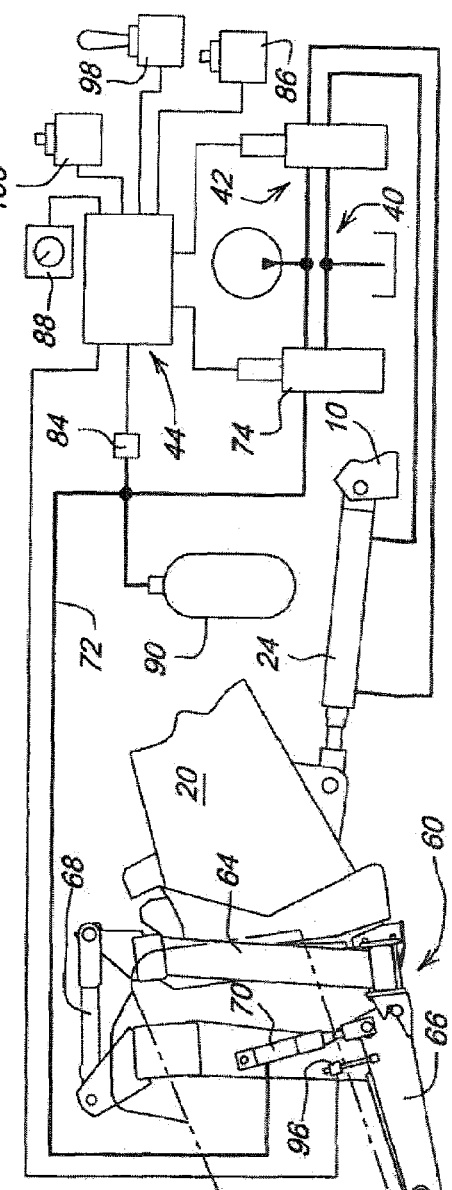

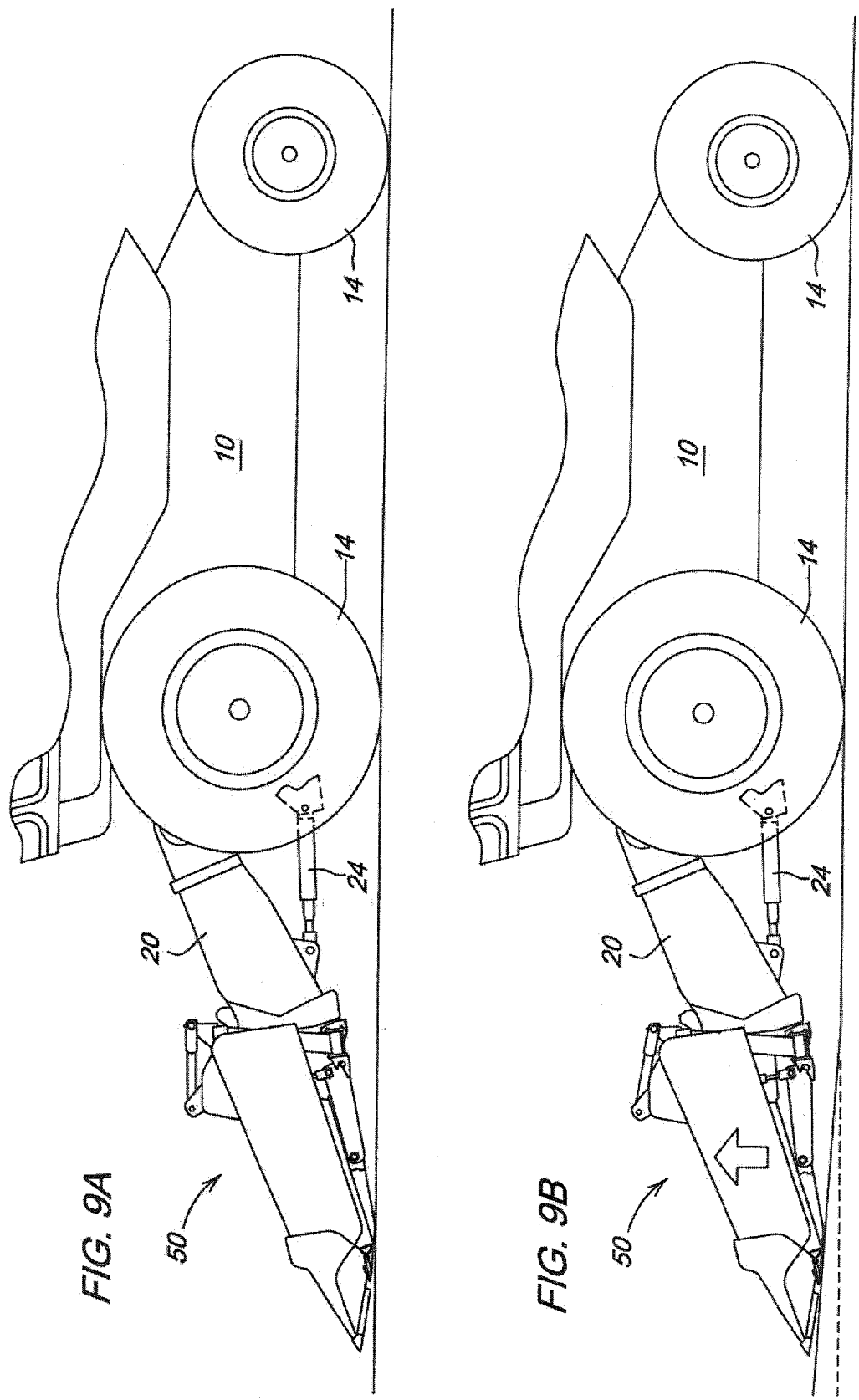

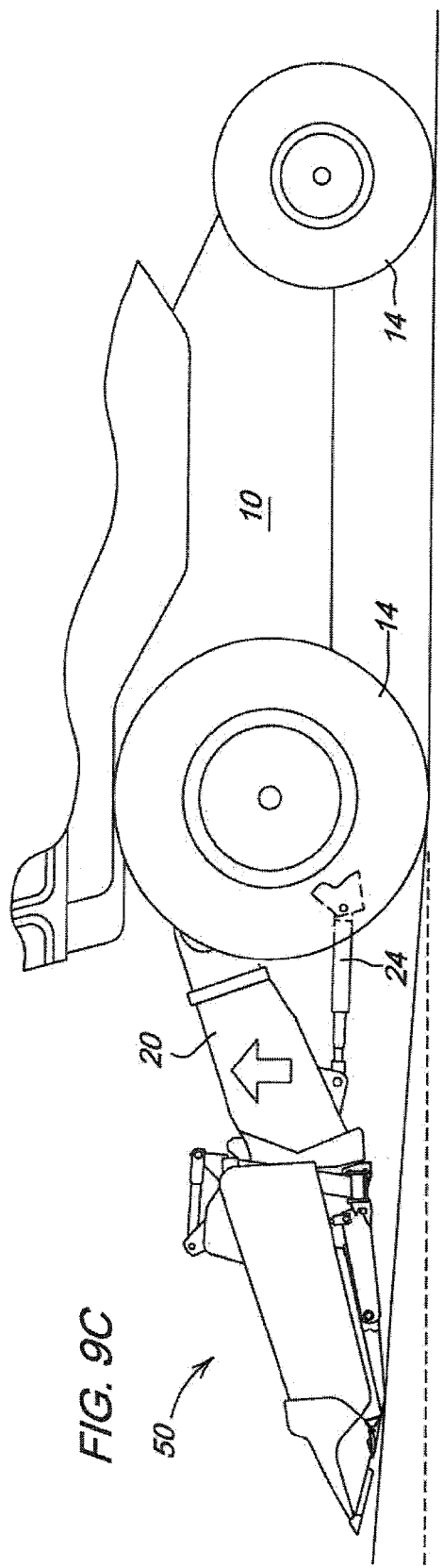
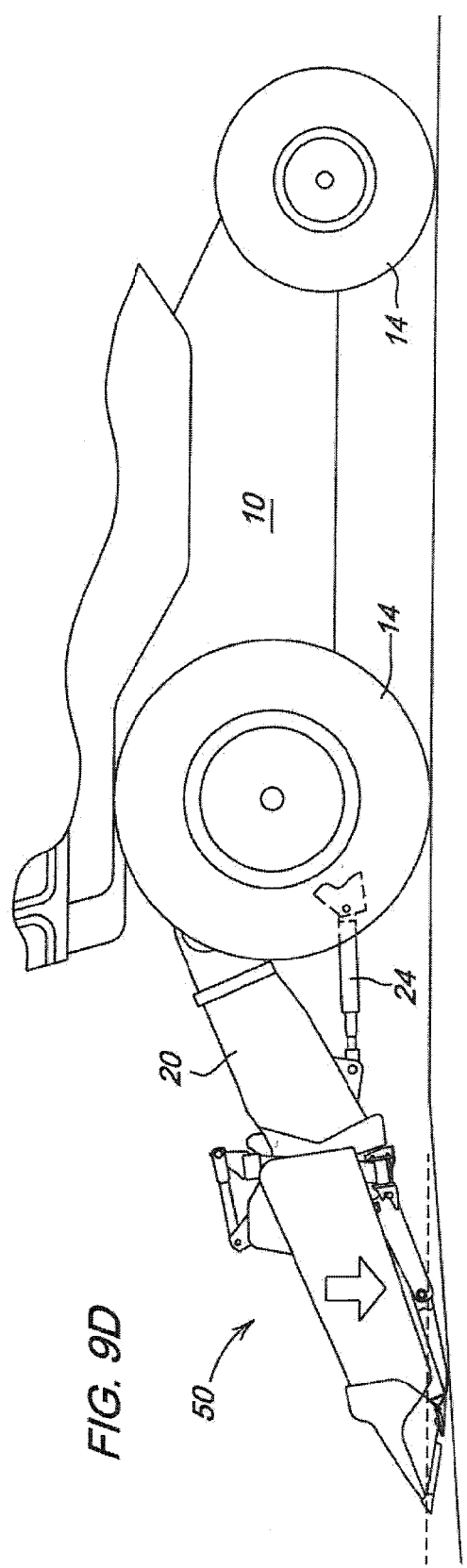

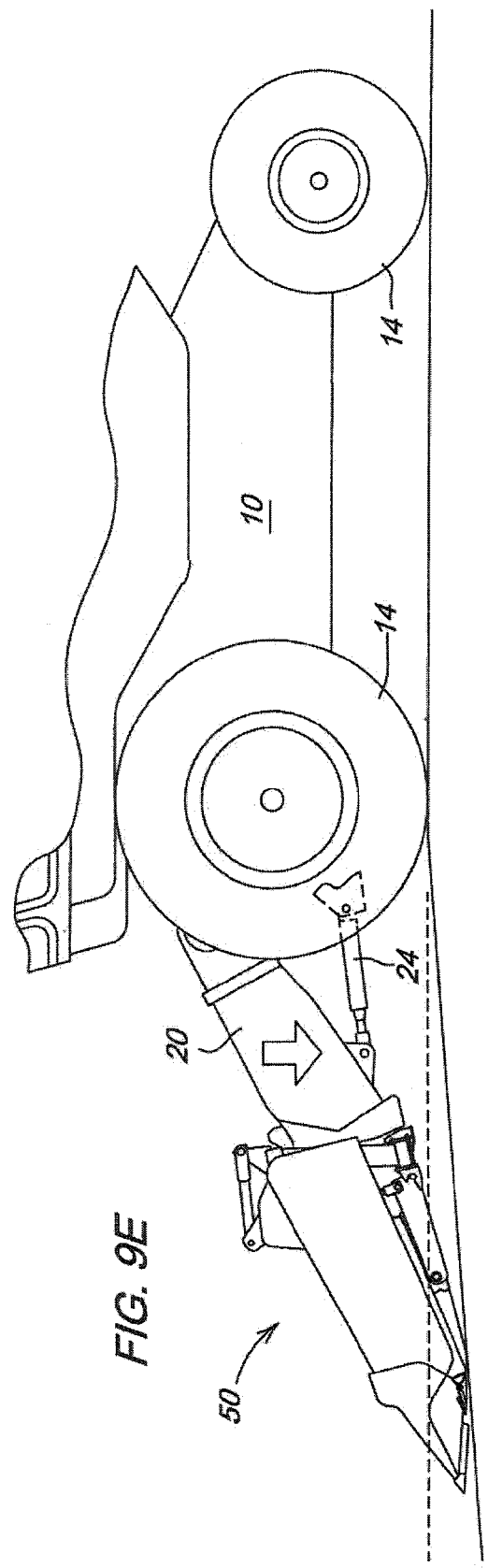

FLOATING HEADER WITH INTEGRATED FLOAT SYSTEM FOR USE WITH AN AGRICULTURAL WINDROWER OR COMBINE

CROSS REFERENCE TO RELATED APPLICATIONS

This is a continuation-in-part of each of U.S. patent application Ser. Nos. 11/125,419, entitled "HEADER HYDRAULIC FLOAT SYSTEM", filed May 10, 2005 now U.S. Pat. No. 7,222,475; 11/125,420, entitled "HEADER HYDRAULIC FLOAT SUSPENSION", filed May 10, 2005 now U.S. Pat. Nos. 7,207,164; and 11/125,421, entitled "HEADER TERRAIN FOLLOWING SYSTEM", filed May 10, 2005 now U.S. Pat. No. 7,191,582.

FIELD OF THE INVENTION

The present invention relates to agricultural harvesters, and, more particularly, to float systems used on headers for such harvesters.

BACKGROUND OF THE INVENTION

An agricultural harvester, such as a combine or windrower, is a large machine used to harvest a variety of crops from a field. In the case of a combine, during a harvesting operation, a header at the front of the combine cuts ripened crop from the field. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

In the case of a windrower, during a harvesting operation, a header at the front of the windrower cuts ripened crop from the field. The crop is transported to the rear of the header and forming shields form a windrow of the crop between the tires of the vehicle for natural dry down of the crop. A subsequent field operation picks up the windrows for further processing, such as separating and cleaning in the case of grain crops, or baling or chopping in the case of hay.

Platform headers and draper headers are header types commonly used when harvesting crops such as small grains, peas, lentils, and rice. During a harvesting operation with these header types, it is desirable to maintain a cutting height as low as possible to the ground in order to collect substantially the entire ripe crop from the field. To accomplish this, it is known to use a header float system or a terrain following system to enable the header to follow the ground over changing terrain without gouging or digging into the soil.

Manufacturers have developed a number of header float systems for use on harvesters such as combines, windrowers, etc. over the years. U.S. Pat. Nos. 3,717,995, 3,623,304, and 4,724,661 disclose examples of header float systems using a resilient suspension to suspend the header, thereby reducing the apparent weight of the header, allowing it to lightly skid across the ground over changing terrain. U.S. Pat. Nos. 3,597,907, 4,622,803 and 5,471,823 disclose examples of similar float systems, but using a dynamic suspension to suspend the header. U.S. Pat. Nos. 5,577,373, 6,041,583 and 6,758,029 B2 disclose examples of terrain following systems which dynamically position the header, thereby sensing and changing the vertical position of the header to follow changing terrain.

What is needed in the art is a float system for a header which is self contained on the header, and a header which can be used with different types of harvesters.

SUMMARY OF THE INVENTION

The invention in one form is directed to an agricultural windrower, including a vehicle chassis, a lift frame movably mounted to the vehicle chassis, and a crop harvesting header coupled with the lift frame. The header includes a main frame and an integrated header float system. The header float system has at least one float cylinder coupled with the main frame.

The invention in another form is directed to a crop harvesting header for use with an agricultural harvester, including a main frame, a suspension movably coupled with the main frame, and a header float system integrated into the header. The suspension is configured to selectively mount to one of a plurality of differently configured types of agricultural harvesters. The header float system has at least one float cylinder coupled between the main frame and the suspension.

BRIEF DESCRIPTION OF THE DRAWINGS

FIG. 2 is a partial side-view of the combine, showing the floating header attached at the front of a feederhouse.

FIG. 3 is a schematic for a dynamic header float system used with the illustrated floating header.

FIG. 4 is a schematic for a resilient header float system used with the illustrated floating header.

FIG. 6A shows a front-view of the combine operating on right-rolling ground with an illustrated float system and the floating header.

FIG. 6B shows a front-view of the combine operating on left-rolling ground with an illustrated float system and the floating header.

FIG. 7 is a schematic for a dynamic header terrain following system combined with the illustrated dynamic float system and floating header.

FIG. 8 is a schematic for a dynamic header terrain following system combined with the illustrated resilient float system and floating header.

FIG. 9A shows a side-view of the combine operating on level ground with the illustrated dynamic header terrain following system and floating header.

FIG. 9B shows the combine operating on inclining ground with the illustrated dynamic header terrain following system at a first instance.

FIG. 9C shows the combine operating on inclining ground with the illustrated dynamic header terrain following system at a second instance.

FIG. 9D shows the combine operating on declining ground with the illustrated dynamic header terrain following system at a first instance.

FIG. 9E shows the combine operating on declining ground with the illustrated dynamic header terrain following system at a second instance.

DETAILED DESCRIPTION OF THE INVENTION

Figure 1:
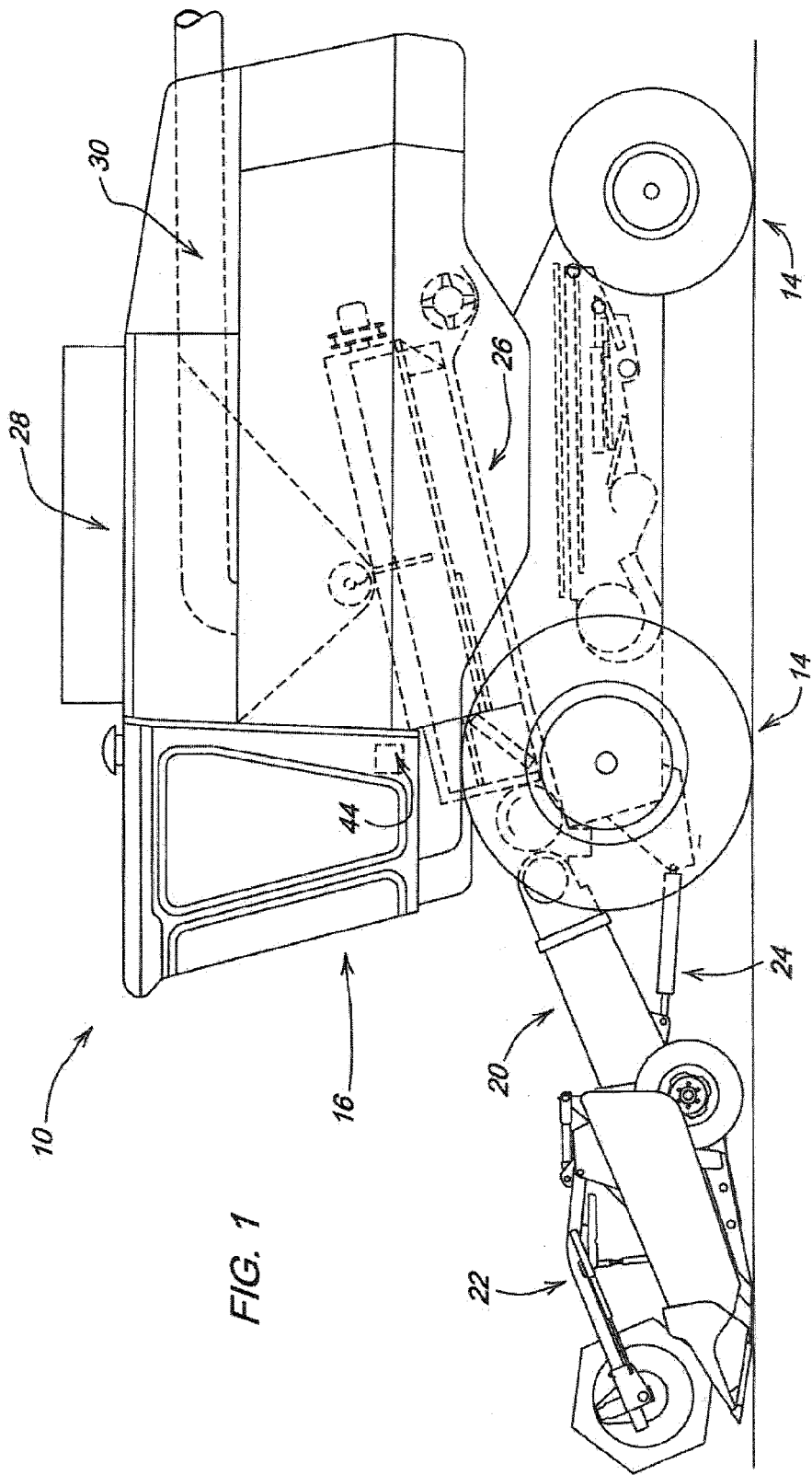
FIG. 1 is a side-view of a combine, showing a floating header having an integrated hydraulic float suspension.

Referring now to the drawings, and more particularly to FIG. 1, there is shown a self-propelled combine 10 commonly used in a grain farming to harvest a variety of crops from a field. An onboard engine powers the combine 10, while ground engaging wheels 14 support and propel the machine. An operator controls the combine 10 from an operator's station located in a cab 16 at the front of the machine. An electronic controller 44, which receives commands from operator input devices and sensors, commands various function of the combine 10.

A feederhouse 20 pivotally attaches at the front of the combine 10, supporting a header 22 removably attached to the front of the feeder house 20. A pair of lift cylinders 24 support and articulate the feederhouse 20 from the combine 10, enabling the raising and lowering of the header 22 relative to the ground. The lift cylinders 24 are single or double acting hydraulic cylinders connected to a main hydraulic circuit 40 by a lift valve 42. The lift valve 42 is an electronically controlled hydraulic valve commanded by the controller 44.

During a harvesting operation, the combine 10 moves forward through the field with the header 22 lowered to a working height. The header 22 cuts and transfers crop material to the feederhouse 20, which in turn transfers the crop material into the combine 10. Once inside the combine, threshing and separating assemblies 26 remove grain from the crop material and transfer it to a grain tank 28 for temporary holding. Crop material other than grain exits from the rear of the combine 10. An unloading auger 30 transfers the grain from the grain tank 28 to a truck or grain cart for transport, or to another receiving bin for holding.

FIG. 2 shows a side-view of a combine 10, illustrating an embodiment for a floating header configuration 50 for a draper-type header. The header 50 includes a frame 52 having a conventional configuration, the frame 52 supporting a reel assembly 54, a cutter-bar assembly 56, and a draper assembly 58. A floating suspension system 60 extending from the rear of the frame 52 primarily supports the header 50 from the feederhouse 20, while downward extending support member 62 serves to secondarily support the header 50 from the ground. In the illustrated embodiment, this support member is a skid plate 62 located near the front of the frame 52, however the portion could also be a gage-wheel (not shown).

The suspension system 60 includes a sub-frame 64 removably attaching to the feederhouse 20, one or more lower links 66, one or more upper links 68, one or more float cylinders 70, a float circuit 72, and a float valve 74. The illustrated embodiment employs two parallel lower links 66, each having a first end 67 pivotally attaching near the bottom of the sub-frame 64. Each lower link 66 extends forward and has a second end 67' pivotally attaching beneath the header frame 52. The illustrated embodiment uses one upper link 68, having a first end 69 pivotally attaching near the top of the sub-frame 64. The upper link 68 extends forward and has a second end 69' pivotally attaching high on the header frame 52.

In the illustrated embodiment, two float cylinders 70, one corresponding to each lower link 66, support the frame 52 from the sub-frame 64. Each float cylinder 70 has a first end 71 attaching to its corresponding lower link 66 near the lower link first end 67. Each float cylinder 70 extends upward and has a second end 71' attaching to the header frame 52. Each float cylinder 70 is a single acting hydraulic cylinder adapted to independently reciprocate over a limit range. Each float cylinder 70 connects to the float circuit 72, which in turn connects to the main hydraulic circuit 40 via the float valve 74. The float valve 74 is adapted to selectively add and subtract hydraulic fluid from the float circuit 72. The illustrated float valve 74 is an electronically controlled hydraulic valve commanded by the controller 44. The controller 44 and float valve 74 are optionally located either on the floating header 22 or on the combine 10.

Figure 5A:
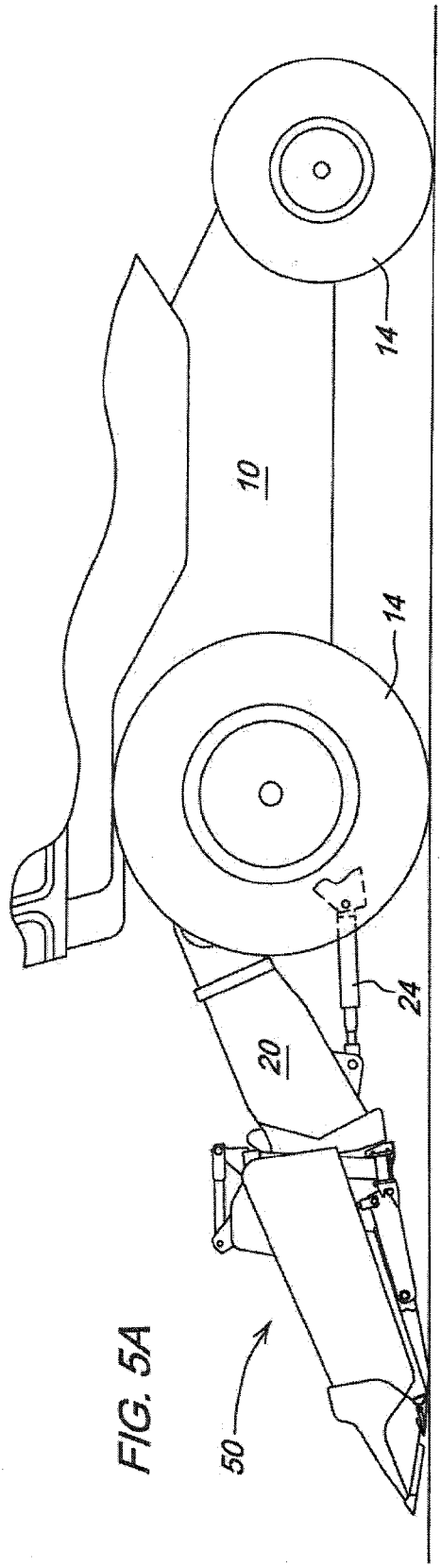
FIG. 5A shows a side-view of the combine operating on level ground with an illustrated float system and the floating header.

FIGS. 3 and 4 show schematics illustrating first and second embodiments, 80, 82 respectively, for header float systems used with the floating header 50. The first embodiment 80 is a dynamic float system, while the second embodiment 82 is a resilient float system. Both header float systems serve to reduce the apparent weight of the header 50 when the working height is such that the header 50 remains in contact with the ground, illustrated in FIG. 5A.

Figure 5B:
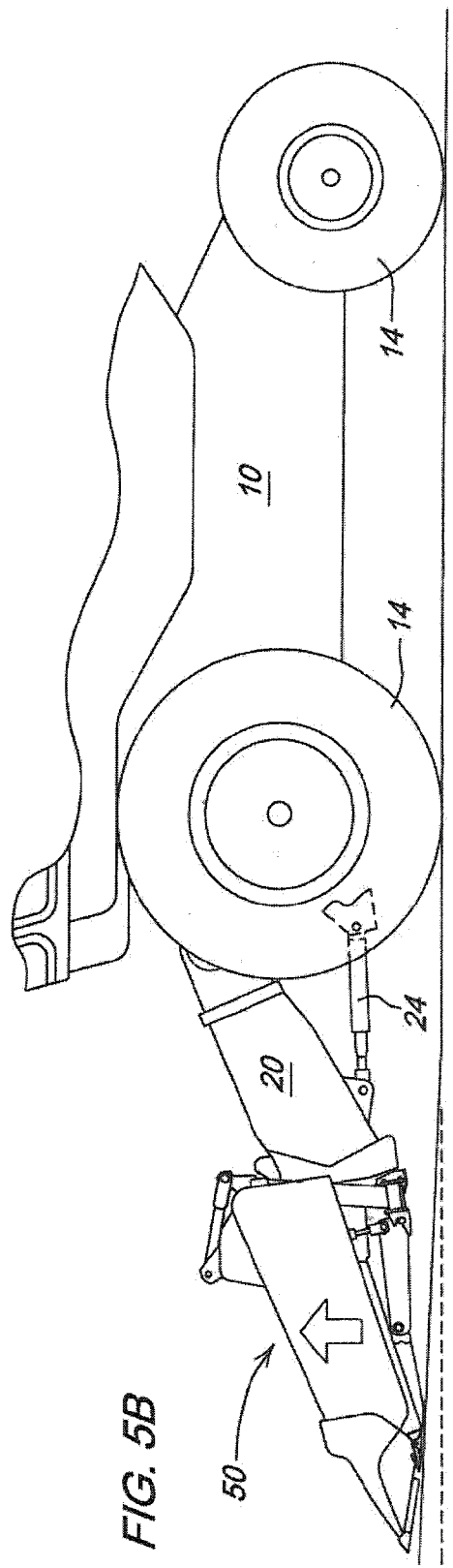
FIG. 5B shows a side-view of the combine operating on inclining ground with an illustrated float system and the floating header.
Figure 5C:
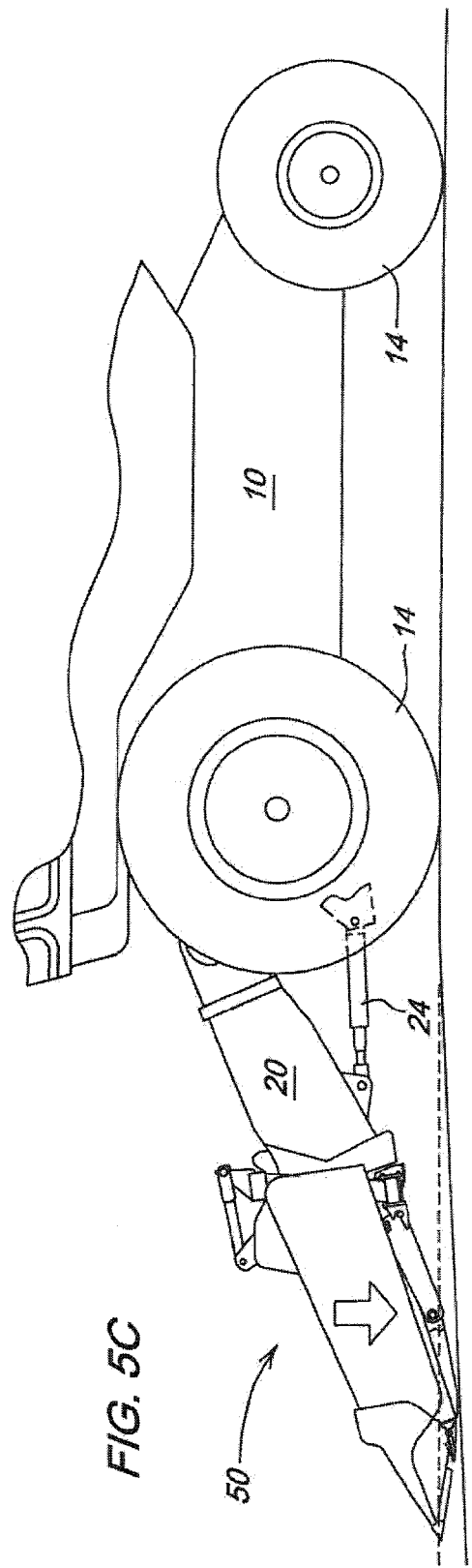
FIG. 5C shows a side-view of the combine operating on declining ground with an illustrated float system and the floating header.

With the apparent weight reduced, the header 50 lightly skids across the ground as the combine 10 moves forward during a harvesting operation, enabling the header 50 to follow changing terrain automatically within the limits of the suspension system 60. As the header 50 skids forward, the ground urges the header 50 up as slope inclines, illustrated in FIG. 5B, and gravity urges the header 50 down as slope declines, illustrated in FIG. 5C. Additionally, the header 50 provides some roll angle floatation relative to the combine 10 due to independent reciprocation of each float cylinder 70, illustrated in FIGS. 6A and 6B.

In the first embodiment 80, a pressure sensor 84 in communication with the controller 44 connects to the float circuit 72 between the float cylinders 70 and the float valve 74. Within the cab 16, operator input devices in communication with the controller 44 allow the operator to control the function of the float system in both embodiments. Operator input devices include, but are not limited to, a float activation device 86 and a float setting device 88. Examples of float activation devices 86 include toggle switches or push buttons. Examples of float setting devices 88 include analog dial input devices or digital input devices. Not shown, an optional shut-off valve isolates the float cylinders 70 from the hydraulic circuit 40, allowing for service of the header 50. Having all of the elements of the first embodiment 80, the second embodiment 82 further includes an accumulator 90 connecting to the float circuit 72 between the float cylinders 70 and float valve 74.

During a harvesting operation with either embodiment 80, 82, the operator engages the float activation device 86 to operate the header 50 in a float mode, and may also manipulate the float setting device 88 for desired header float response. Once engaged in the header float mode, the controller 44 reads the float setting device 88, indicating a level of suspension support required of the float system 80, 82 by the operator, for example, as percent of header weight or desired pressure in the float circuit. The controller 44 then determines a target pressure in the float circuit adequate to provide the suspension support commanded.

To determine the target pressure for the float circuit 72, the controller 44 may reference data correlating pressure values in the float circuit 72 with suspension support values. This correlated pressure data will vary from header to header as a function of header weight and suspension configuration, and may generate from tables, formulas, or sensor readings. The controller 44 might read the correlated data from a storage device on the header 50. Data might also be stored in memory internal to the combine, with the controller 44 selecting the appropriate data after sensing the header type attached to the combine 10.

Alternatively, the controller 44 may determine the target pressure for the float circuit 72 by reading the pressure sensor 84 in the float circuit 72 when the header 50 at a height where the skid plates are not in contact with the ground. At such a height, the suspension supports the entire weight of the header, and the pressure in the float circuit indicates a baseline pressure whereby the float cylinders 70 entirely support the header 50. The controller 44 then determines the target pressure by multiplying the baseline pressure by a factor corresponding to the suspension support indicated from the float setting device 88.

In the first embodiment 80, the controller 44 continuously compares the target pressure with pressure sensor 84 readings indicating pressure in the float circuit 72, commanding the float valve 74 to add or subtract hydraulic fluid from the float circuit 72 to maintain pressure sensor 84 readings equal to the target pressure. In this manner, the controller 44 continuously maintains target pressure in the float circuit 72 as the float cylinders 70 reciprocate over changing terrain, providing constant support of the header 50 by the float suspension 60 as the combine 10 travels through the field. To change header float response while operating in header float mode, the operator may further manipulate the float setting device 88 without disengaging the float system. The controller 44 continuously monitors the float setting device 88 for changes, determining and applying new target pressures accordingly. The header float system continues to function until the operator disengages the float activation device 86.

In the second embodiment 82, the controller 44 only initially compares the target pressure with the pressure sensor 84 readings indicating float circuit 72 pressure, commanding the float valve 74 to add or subtract hydraulic fluid from the float circuit 72 until the reading from the pressure sensor 84 matches the target pressure. Once charged to the target pressure, the float circuit 72 is sealed and the accumulator 90 acts to maintain target pressure in the float circuit 72 as the float cylinders 70 reciprocate over changing terrain. To change header float response while operating in header float mode, the operator may further manipulate the float setting device 88 without disengaging the float system. The controller 44 continuously monitors the float setting device 88 for changes, determining and applying new target pressures accordingly. The header float system continues to function until the operator disengages the float activation device 86.

FIGS. 7 and 8 show schematics illustrating first and second embodiments, 92, 94 respectively, for a terrain following system used with the floating header 50. Both systems serve to extend the terrain following capability of the floating header system 80, 82 by dynamically actuating the lift cylinders 24 in response to reciprocation of the float cylinders 70. As the ground urges the header 50 up on inclines, shown in FIG. 9B, the terrain following system 92, 94 causes the lift cylinders 24 to raise the header 50 upward such that the float cylinders 70 return to a nominal position, shown in FIG. 9C. As gravity urges the header 50 down on declines, shown in FIG. 9D, the terrain following system 92, 94 causes the lift cylinders 24 to lower the header 50 downward such that the float cylinders 70 again return to their nominal position, shown in FIG. 9E.

The first embodiment 92 is a terrain following system used with the dynamic header float system 80, while the second embodiment 94 is a terrain following system used with the resilient header float system 82. In both embodiments, a position sensor 96 in communication with the controller 44, in the form of a potentiometer, indicates relative reciprocation of each cylinder. In the illustrated embodiments, each position sensor 96 attaches to a corresponding lower link 66 and to the frame 52. Within the cab 16, operator input devices in communication with the controller 44 allow the operator to control the function of the terrain following system 92, 94. Operator input devices include, but are not limited to, a lift command device 98 and a system activation device 100. Examples of system activation devices 100 include toggle switches or push buttons. Examples of lift command devices 98 include levers or joystick controls.

During a harvesting operation with either embodiment 92 or 94, the operator manipulates the lift command device 98, causing the controller 44 to command the lift cylinders 24 to lower the header 50 until the header 50 contacts the ground. The operator then engages the system activation device 100 to operate in a terrain following mode. Once engaged, the controller 44 continuously reads both position sensors 96, calculates the average of the position sensor 96 readings, and then commands the lift valve 42 to add or subtract hydraulic fluid from the lift cylinders 24 until the average of the position sensor 96 readings indicate that the float cylinders 72 are at their nominal position. In this manner, the controller 44 continuously adjusts header 50 height over changing terrain, positioning the float header 50 for optimal function of the header float system 80, 82 as the combine 10 travels through the field. The terrain following system 92, 94 continues to function until the operator disengages the system activation device 100, or until the operator manipulates the lift command device 98 to raise or lower the header 50.

Figure 10:
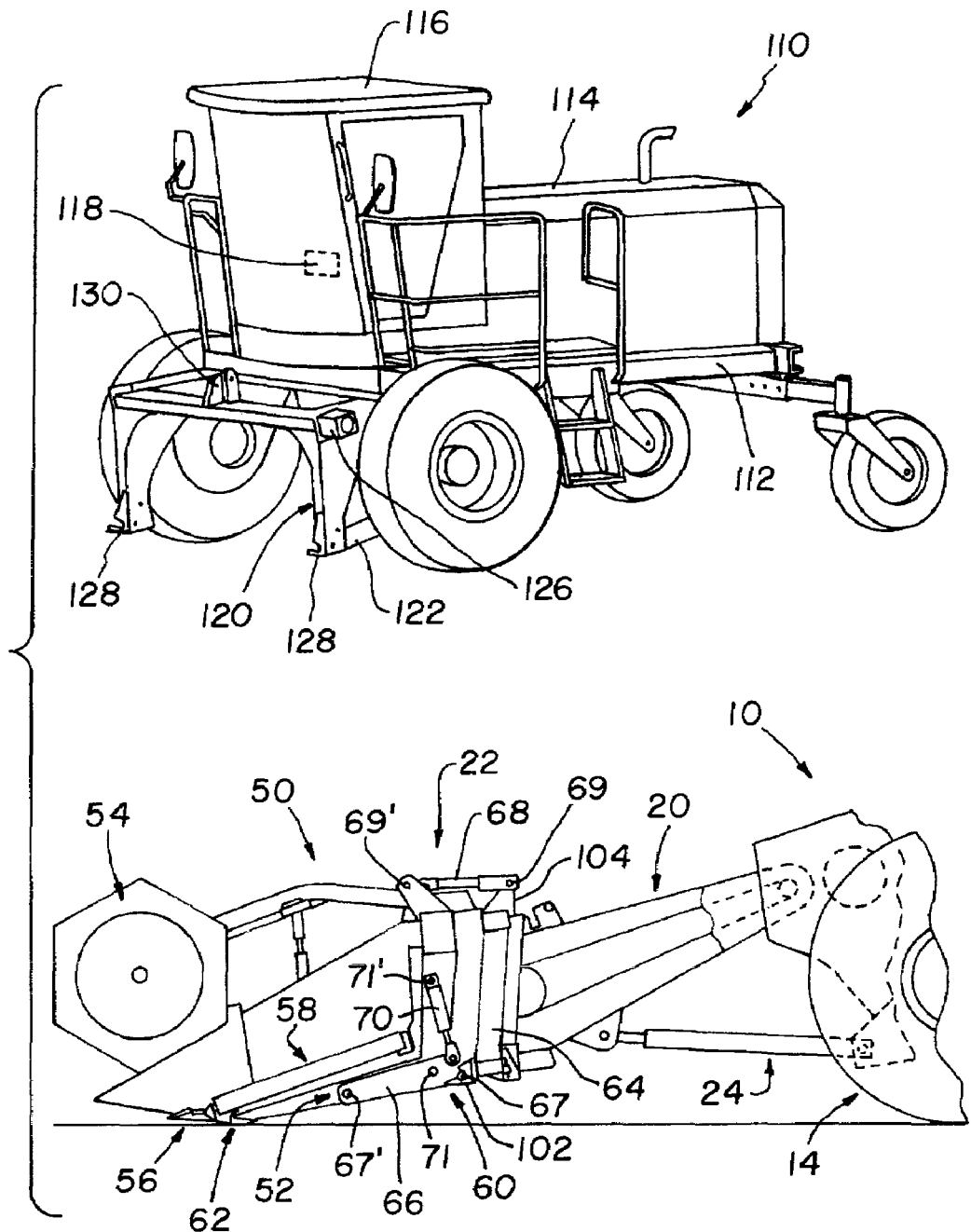
FIG. 10 is a perspective view of the header shown in FIG. 2, which is configured to selectively mount to a combine or a windrower.

FIG. 10 is a composite view illustrating the floating header 50 shown in FIG. 2 coupled with combine 10 (bottom illustration in FIG. 10), and also illustrates how floating header 50 is adapted to be coupled with a different type of agricultural harvester such as windrower 110. Providing a single floating header 50 which can be coupled with different types of harvesters (e.g., a combine or windrower) allows reduction in operating costs.

Figure 11:
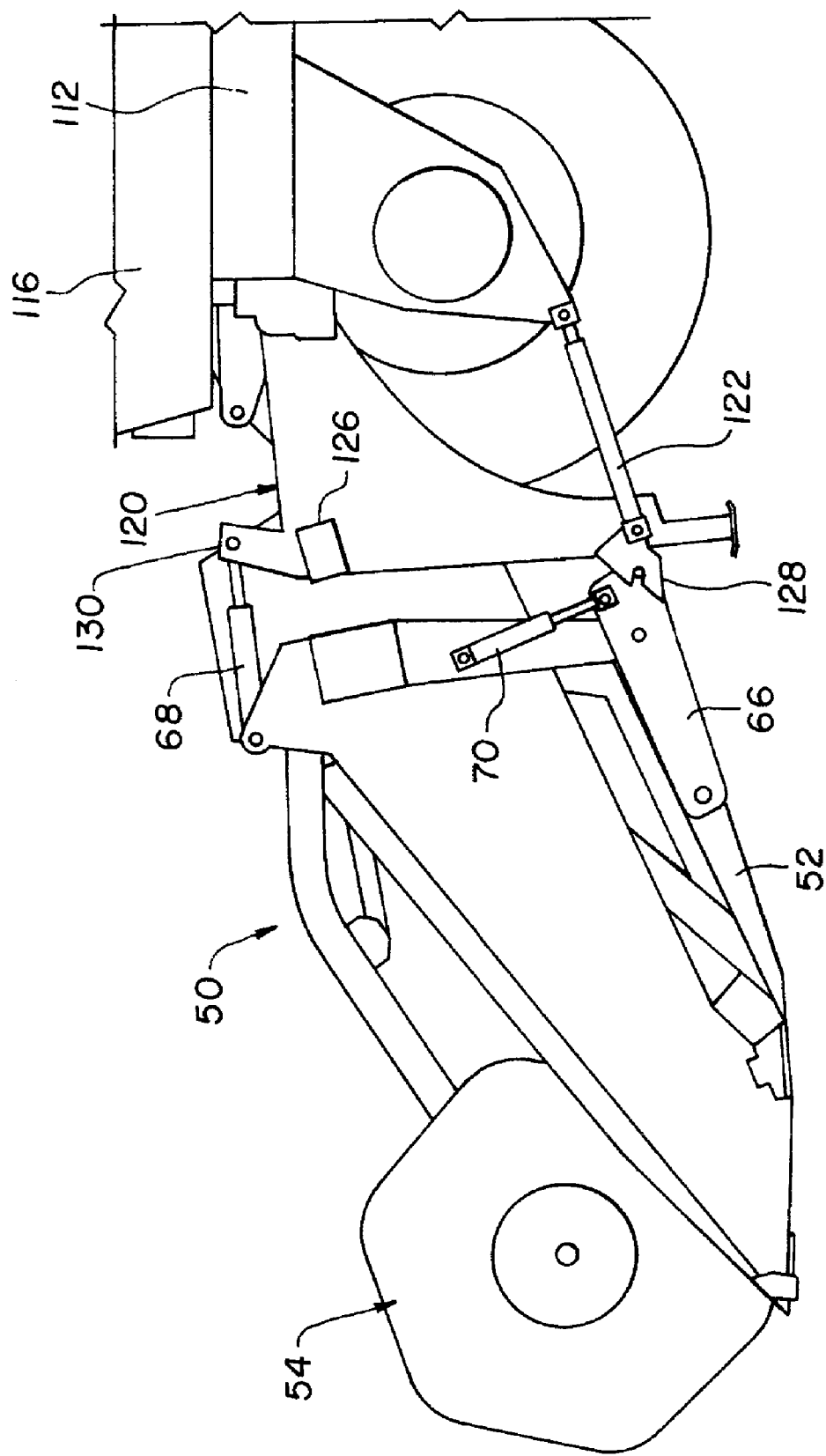
FIG. 11 is a side view of the floating header in FIG. 10, shown attached to the front of the windrower shown in FIG. 10 (windrower shown partially).
Figure 12:
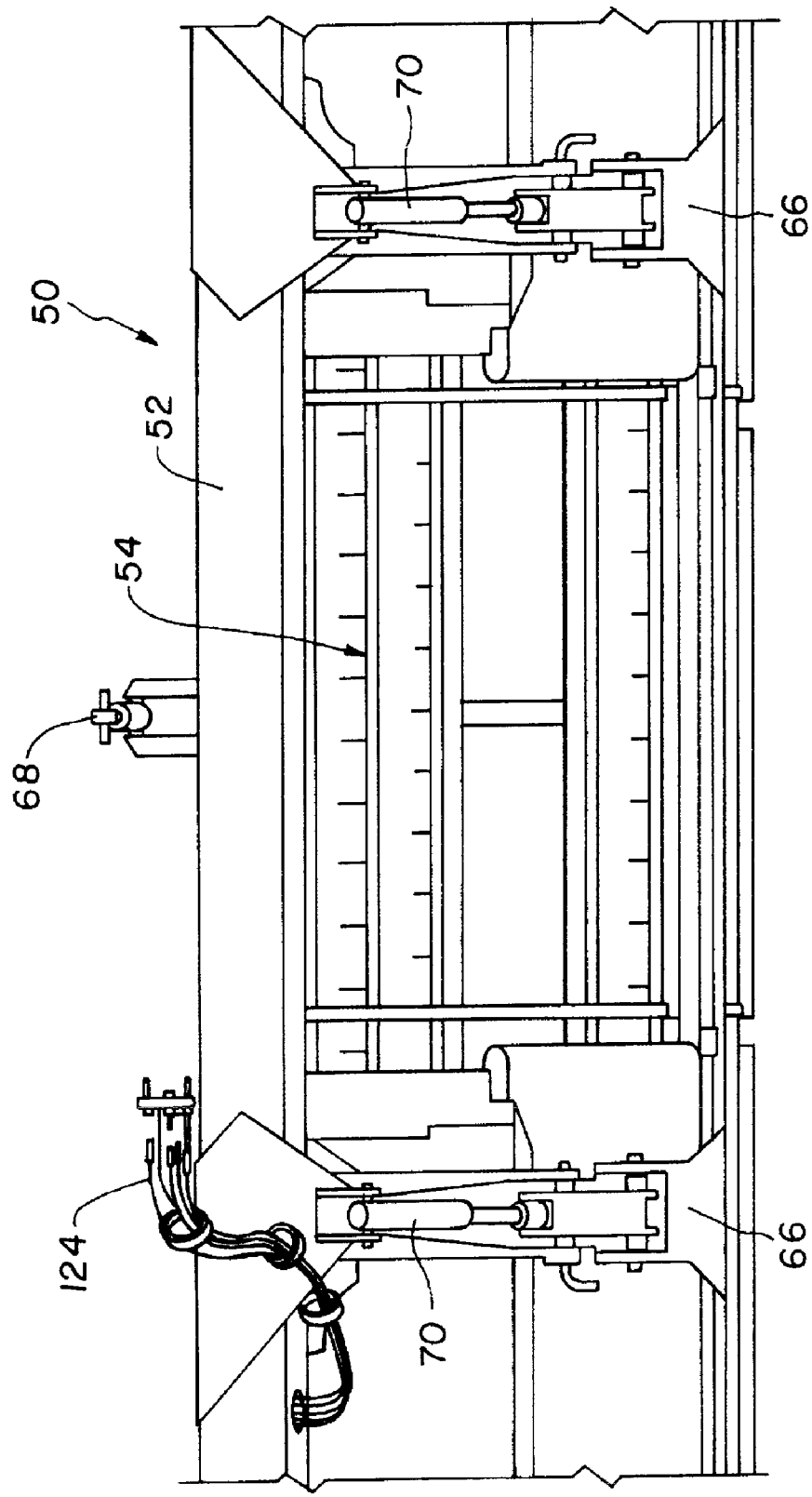
FIG. 12 is a partial rear view of the header shown in FIGS. 10 and 11.

Similar to combine 10, windrower 110 includes a vehicle chassis 112 supporting a vehicle body 114 and operator's cab 116. Windrower 110 typically includes at least one onboard electronic control unit (ECU) 118, usually positioned within cab 116 as shown. Windrower 110 also includes a lift frame 120 which is pivotally mounted to vehicle chassis 112 and detachably couples with floating header 50, as will be described in more detail hereinafter (FIGS. 10 and 11). A lift cylinder 122 coupled between vehicle chassis 112 and lift frame 120 is used to move header 50 to a selected operating or transport height. ECU 118 onboard windrower 110 includes the control logic for operation of the electronics and hydraulics associated with the header float system of header 50. A number of hydraulic hoses 124 carried on header 50 are coupled with the main hydraulics of windrower 110 for various hydraulic functions (FIG. 12). A mechanical drive 126 extending laterally from lift frame 120 is coupled with driven mechanical components (e.g., cutterbar) on header 50 in known manner.

In the embodiment of floating header 50 above coupled with combine 10, sub-frame 64 is described as being part of suspension 60 and removably attached to the front end of feederhouse 20. Sub-frame 64 includes a pair of bottom couplers 102 (one of which is shown in FIGS. 2 and 10) and a top coupler 104. Each bottom coupler 102 attaches in a conventional quick attach manner with an outboard end of a corresponding lower link 66. Top coupler 104 attaches with an outboard end of upper link 68. Upper link 68 may be a fixed link, manually adjustable link or adjustable hydraulic cylinder which is pinned to top coupler 104. Sub-frame 64 thus attaches with lower links 66 and upper link 68 very similar to the way a conventional 3 point hitch is coupled with an implement at the rear of a tractor. When header 50 is detached from combine 10, sub-frame 64 remains mounted to feederhouse 20.

Similarly, lift frame 120 of windrower 110 includes a pair of bottom couplers 128 and a top coupler 130. Each bottom coupler 128 attaches in a conventional quick attach manner with an outboard end of a corresponding lower link 66. Top coupler 130 attaches with an outboard end of upper link 68. When header 50 is detached from windrower 110, lift frame 120 remains pivotally mounted to vehicle chassis 112.

Lift frame 120 has an advantage of simply and directly interconnecting header 50 with vehicle chassis 112 of windrower 110. It is also possible to use an intervening sub-frame between lift frame 120 and header 50, similar to sub-frame 64 described above with regard to the embodiments shown in FIGS. 1-9. The sub-frame would remain attached to header 50 when detached from lift frame 120, and would have an advantage of holding upper link 68 at a fixed orientation for easier subsequent attachment with lift frame 120.

Windrowers of known design may include a header float system which is carried by the windrower chassis, but do not include a header float system which is mounted on and carried by the header itself. By placing the float system on the header rather than work machine, separate float systems need not be separately provided on the combine or windrower, thus reducing operating costs, redundancy, etc. Along those same lines, control logic for header 50 is described above as being under the control of an ECU 44 (FIG. 1) or 118 (FIG. 10) onboard the work machine. However, it is also possible to provide header 50 with an onboard ECU (not shown) with control logic for the electronics and hydraulics used in the header float system. This has the advantage of not having to program the ECU onboard the work machine, and also reducing process loading on the ECU onboard the work machine. Of course, an ECU on the header may be configured to communicate with the ECU on the work machine, either wired or wireless, etc.

When header 50 is coupled with windrower 110, it is to be understood that header 50 can be configured to include all of the features and functions described above with regard to the embodiments shown in FIGS. 1-9. For example, when used with windrower 110, header 50 can include a dynamic or resilient float system (FIGS. 3 and 4), a header terrain following system (FIGS. 7 and 8), etc.

Having described the preferred embodiment, it will become apparent that various modifications can be made without departing from the scope of the invention as defined in the accompanying claims.

The invention claimed is:

1. An agricultural windrower, comprising:
   a vehicle chassis;
   a lift frame movably mounted to said vehicle chassis; and
   a crop harvesting header coupled with said lift frame, said header including a main frame and an integrated header float system, said header float system having at least one float cylinder coupled with said main frame and a position sensor on said header indicating the relative position of said float cylinder.

2. The agricultural windrower of claim 1, wherein said header includes a suspension movably supporting said main frame from said lift frame, each at least one said float cylinder coupled between said suspension and said main frame.

3. The agricultural windrower of claim 2, wherein said suspension includes a plurality of links movably supporting said main frame, each said float cylinder being coupled between said main frame and a corresponding one of said plurality of links.

4. The agricultural windrower of claim 1, wherein said at least one float cylinder comprises two float cylinders.

5. The agricultural windrower of claim 1, wherein said header includes a hydraulic float circuit fluidly coupled with each at least one said float cylinder.

6. The agricultural windrower of claim 5, further including a controller receiving signals from said position sensor and which controllably actuates said hydraulic float circuit.

7. The agricultural windrower of claim 6, including at least one lift cylinder coupled between said vehicle chassis and said lift frame, said controller being configured with a terrain following mode for controllable actuation of each said lift cylinder to raise and lower said header dependent upon a relative vertical position between said main frame and said lift frame.

8. The agricultural windrower of claim 6, wherein said windrower includes an operators cab, and said controller is located on one of said operators cab and said header.

9. The agricultural windrower of claim 1, wherein said lift frame directly interconnects said header with said vehicle chassis.

10. The agricultural windrower of claim 9, wherein said lift frame is pivotally coupled with said vehicle chassis.

11. A crop harvesting header for use with an agricultural harvester, comprising:
    a main frame;
    a suspension movably coupled with said main frame, said suspension configured to selectively mount to one of a plurality of differently configured types of agricultural harvesters; and
    a header float system integrated into said header, said header float system having at least one float cylinder coupled between said main frame and said suspension and a position sensor on said header indicating the relative position of said float cylinder.

12. The crop harvesting header of claim 11, wherein said suspension includes a plurality of links movably supporting said main frame said plurality for links being configured to selectively couple with one of said plurality of differently configured agricultural harvesters.

13. The crop harvesting header of claim 12, wherein each said float cylinder is coupled between said main frame and a corresponding one of said plurality of links.

14. The crop harvesting header of claim 11, wherein said suspension is configured to selectively mount to one of a windrower and a combine.

15. The crop harvesting header of claim 11, wherein said suspension is configured to selectively mount to one of a lift frame on a windrower and a feederhouse on combine.

16. The crop harvesting header of claim 11, wherein said at least one float cylinder comprises two float cylinders.

17. The crop harvesting header of claim 11, wherein said header includes a hydraulic float circuit fluidly coupled with each said float cylinder.

\* \* \* \* \*